United States Patent [19]
Kimura et al.

[11] 3,740,160
[45] June 19, 1973

[54] NUMERICAL CONTROLLED BORING MACHINE

[75] Inventors: Akira Kimura, Yokohama  
Masaharu Tajima, Kawasaki  
both of Japan

[73] Assignee: Ikegai Tekko Kabushiki Kaisha, Tokyo, Japan

[22] Filed: May 21, 1971

[21] Appl. No.: 145,759

[30] Foreign Application Priority Data  
May 26, 1970 Japan.................................. 45/45045

[52] U.S. Cl...................... 408/2, 408/13, 408/150, 82/14 D
[51] Int. Cl.............................................. B23b 49/00
[58] Field of Search.................. 408/2, 13, 12, 150; 82/14 D

[56] References Cited
UNITED STATES PATENTS
3,623,216  11/1971  Aihara et al............................. 408/2

*Primary Examiner*—Francis S. Husar  
*Attorney*—Cushman, Darby & Cushman

[57] ABSTRACT

A numerical controlled machine tool adapted to process a bore in a work-piece by the use of a single point cutting tool supported in the main spindle of the machine tool in which a main spindle assembly comprising a main spindle sleeve having an axially extending eccentric opening and said main spindle received in said eccentric opening and having a tool mounting portion. The diameter of a bore to be processed can be adjusted by varying the eccentricity of the tool mounting portion of the main spindle with respect to the main spindle sleeve and the eccentricity of the tool mounting portion with respect to the sleeve can be varied in accordance with a control signal from a numerical control device. A numerical control shaft for measuring the diameter of a bore processed is provided independently of numerical control shafts for positioning and the numerical control shaft is adapted to measure the bore diameter by moving a measuring element in accordance with a bore diameter predetermined by a numerical control program and in order to compensate for any difference between the predetermined bore diameter and the measured bore diameter, prior to the following finish boring operation, the eccentricity of the tool mounting portion of the main spindle with respect to the sleeve is adjusted by the measured deviation amount of bore diameter so that a desired bore diameter can be obtained in the finish boring operation.

3 Claims, 8 Drawing Figures

NUMERICAL CONTROLLED BORING MACHINE

BACKGROUND OF THE INVENTION

This invention relates to improvements in numerical controlled boring machines and more particularly, to a numerical controlled boring in which a main spindle assembly adapted to support a tool and adjust the diameter of a bore to be processed and a measuring device adapted to measure the bore diameter are operated in cooperation with each other.

Hithertofore, in the processing of a bore in a workpiece by the use of a single point cutting tool in a numerical controlled boring machine, in order to process the bore with a high precision, it has been generally followed that prior to a finish boring operation, the bore is preformed in a trial or tentative boring operation to a diameter slightly smaller than a final or desired diameter, the diameter of the preformed bore is measured against the desired bore diameter, the mounting position of the tool is adjusted in accordance with the measured result to compensate for the deviation of the diameter of the preformed bore from the desired diameter and then, the finish operation is performed. In such a conventional boring machine, there are provided numerical control shafts for controlling the position and depth of a bore being processed, that is, the shafts for controlling X, Y and Z values. However, in the processing of a bore using the conventional machine, the diameter of the bore to be processed is important as well as the position and depth of the bore and especially, in the processing of a bore by the use of a single point cutting tool, precise processing of the bore with a desired or predetermined diameter requires a great deal of labor and time. This is a disadvantage in the prior art.

SUMMARY OF THE INVENTION

This invention is to eliminate the above-mentioned inherent disadvantage in the conventional numerical controlled boring machines by correlating the operation of a main spindle assembly adapted to support a tool and adjust the cutting-in depth of a particular cutting tool being employed in response to an external input signal with that of the numerical control system of a bore diameter measuring device by means of a program tape.

One major object of the present invention is to automatically correlate the bore diameter measuring function with the cutting depth adjusting function in a numerical controlled boring machine which is designed to perform the boring function by the use of a single point cutting tool.

Another object of the present invention is to provide a numerical controlled boring machine which can process bores with high precision and has minimum down time and minimum dependence upon the operator.

Another object of the present invention is to provide a numerical controlled boring machine which, when operated for processing bores of different diameters, can perform the bore diameter measuring function and cutting function with high accuracy, minimum dependence on the operator and high efficiency in accordance with the processing sequence as memorized in a program tape.

Another object of the present invention is to provide a numerical controlled machine which can minimize error in bore diameter which may be caused when a cutting tool is mounted in and/or removed from the machine.

Another object of the present invention is to provide a numerical controlled machine which can promptly detect wear on a particular cutting tool employed, error in presenting and/or error in program by detecting any excessive difference between a predetermined bore diameter and an obtained bore diameter through an in-process measuring and compensate for the difference.

Another object of the present invention is to provide a numerical controlled boring machine which can automatically measure even a slight difference between a predetermined or desired bore diameter and an actual bore diameter processed and also automatically adjust the cutting-in depth of a particular cutting tool employed so that a desired bore of high precision can be processed.

In order to attain the above objects, according to the present invention, there is provided a numerical controlled boring machine which comprises a spindle head including a main spindle assembly in which a single point cutting tool is mounted for boring a workpiece, and in which the main spindle assembly has a main spindle provided with a tool mounting portion incorporated therein and a main spindle sleeve surrounding the main shaft and having an axial eccentric opening for receiving the main spindle whereby when the eccentricity of the tool mounting portion with respect to the sleeve can be varied from a compensation drive source through a differential gearing so as to adjust the diameter of a particular bore being processed. In the numerical controlled boring machine, there is further provided a bore diameter measuring and control shaft independently of numerical control shafts for determining the position of a bore to be processed in a particular workpiece which numerical control shaft is conventionally provided in a prior art numerical controlled boring machine and a measuring element is also provided for displacing along the bore diameter measuring and control shaft in accordance with a bore diameter as determined by a numerical control program whereby the diameter of a preformed bore is measured against the predetermined bore diameter as dictated by the numerical control program to detect any difference between the two bore diameters and thereafter, the compensating drive source is imparted thereto an input corresponding to the detected diameter difference so as to compensate for the bore diameter difference.

The above and other objects and attendant advantages of the present invention will be more clearly apparent to those skilled in the art from a reading of the following detailed description referring to the accompanying drawings which show a preferred embodiment of the invention for illustration purpose only, but not for limiting the scope of the invention in any way.

BRIEF DESCRIPTION THE DRAWINGS

Figure 1:
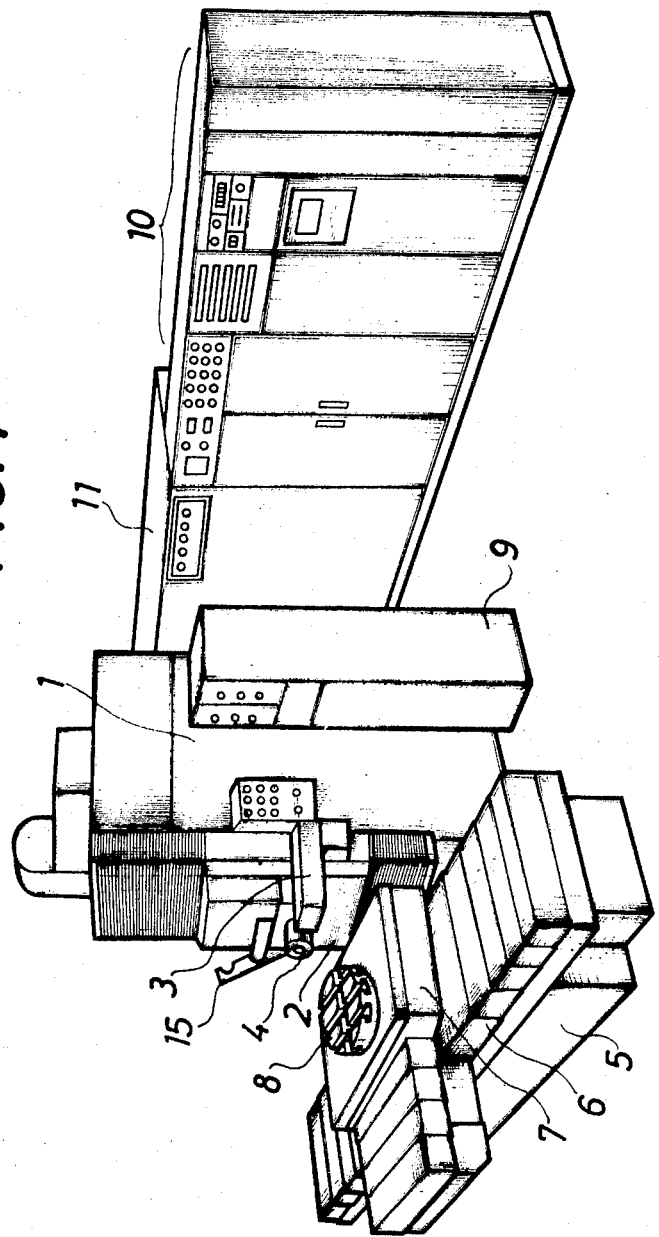
FIG. 1 is a perspective view of a preferred embodiment of the numerical controlled boring machine constructed in accordance with the principle of the present invention.
Figure 5:
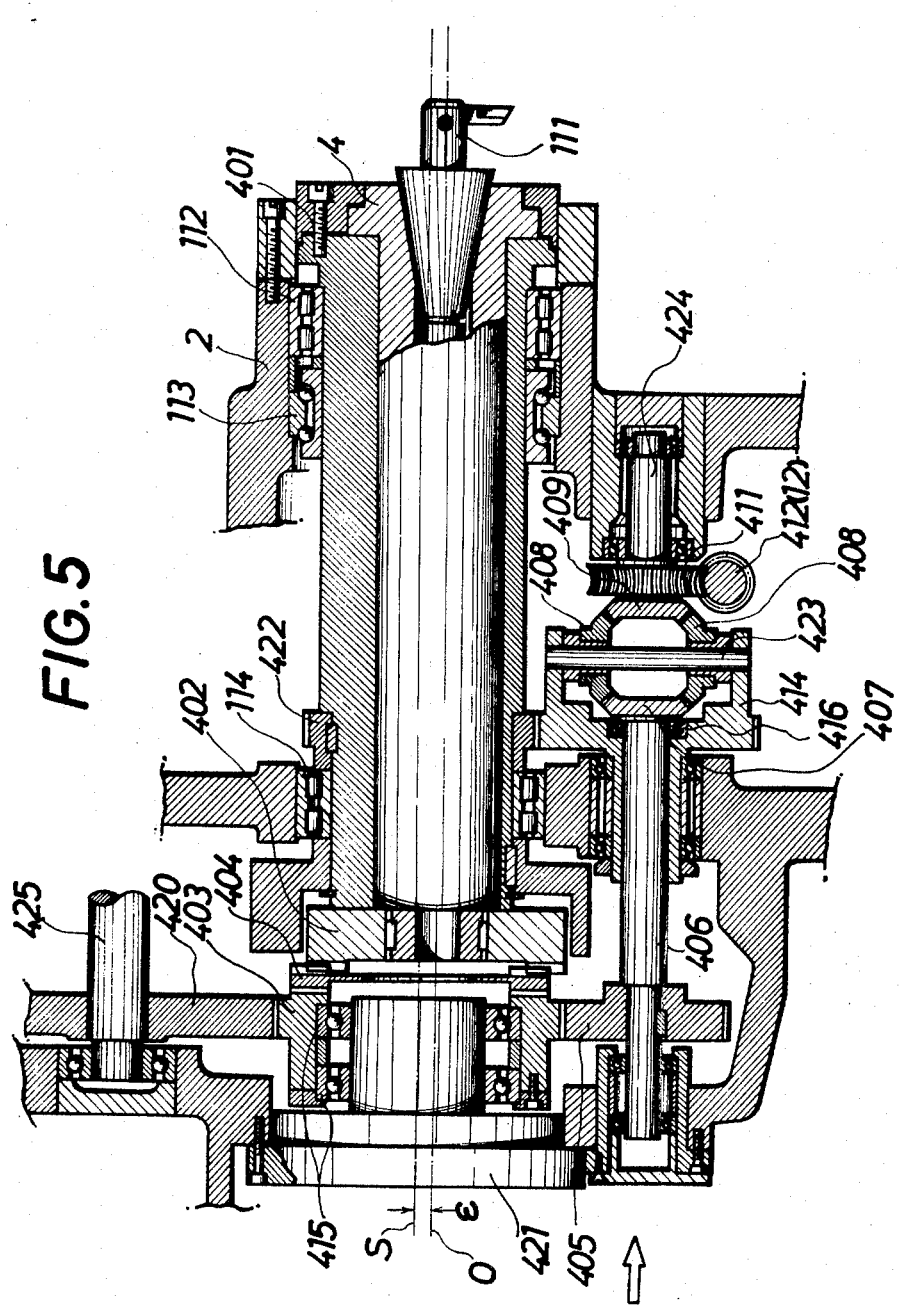
FIG. 5 is an enlarged fragmentary view in section of the main spindle assembly shown in FIG. 1 which supports a cutting tool in such a manner that the cutting-in depth of the edge of the tool can be adjusted.
Figure 6:
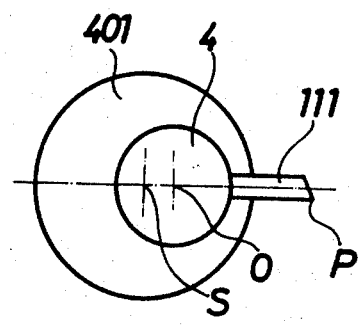
Figure 7:
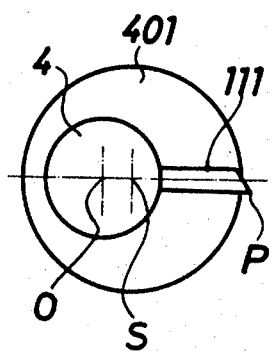
Figure 8:
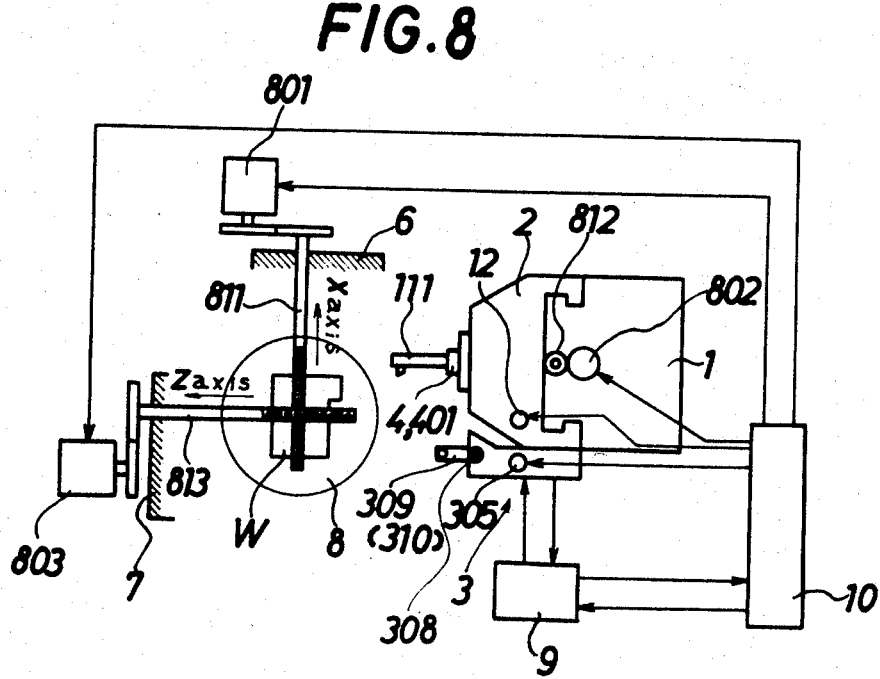

FIG. 6 and 7 are explanative views showing the relationship of eccentric positions of the main spindle with respect to the main spindle sleeve in the main spindle assembly shown in FIG. 5 and positions of the edge point of the cutting tool as seen in plan view from the tool side; and FIG. 8 is a schematic block diagram for explaining the operation of said numerical controlled boring machine of FIG. 1.

PREFERRED EMBODIMENT OF THE INVENTION

The present invention will be now described referring to the accompanying drawings and more particularly, to FIG. 1 thereof in which a preferred embodiment of the automatic bore diameter measuring and compensating apparatus according to the invention is shown as being incorporated in a numerical controlled boring machine for controlling the operation of the machine.

Figure 2:
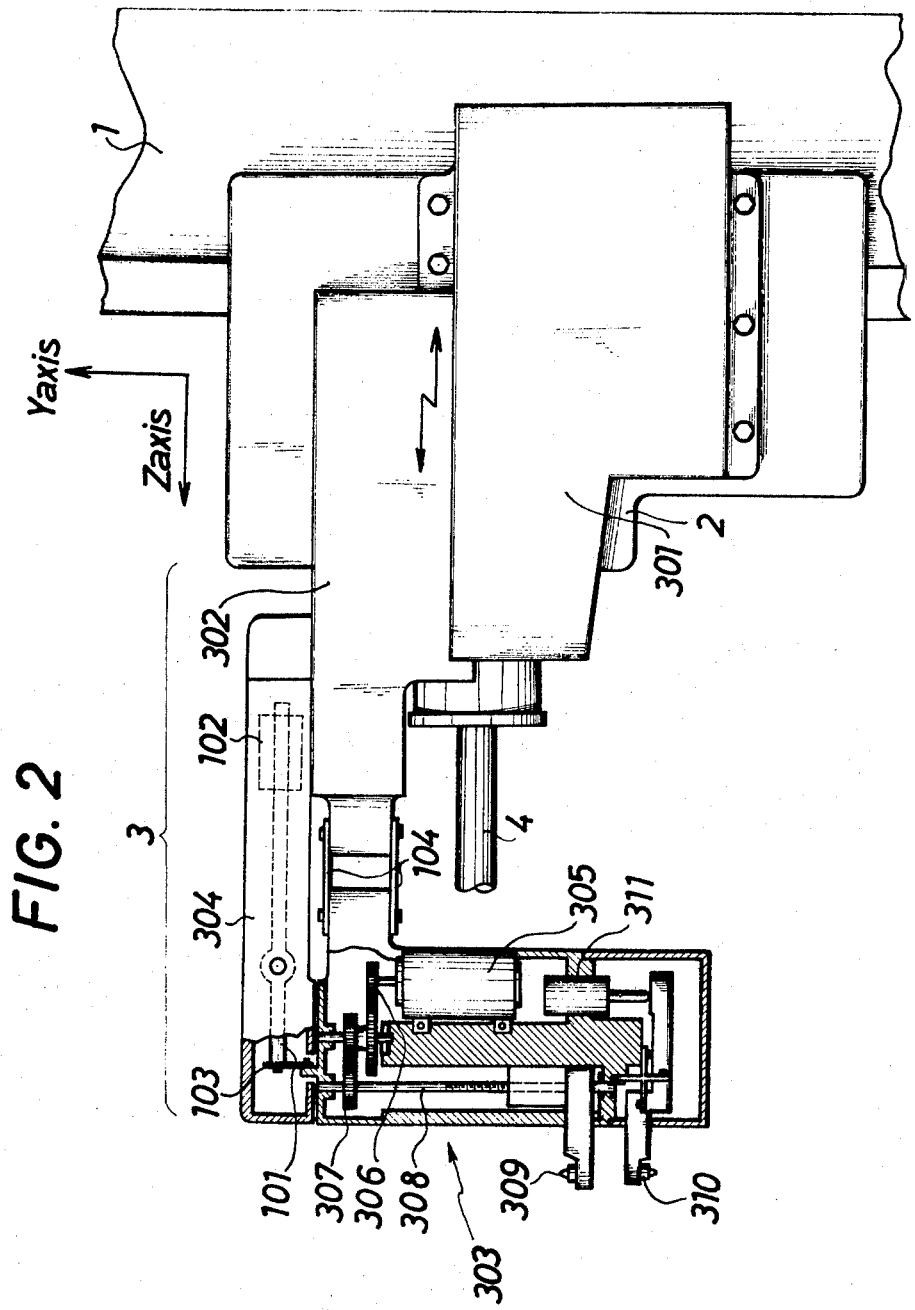
FIG. 2 is an enlarged fragmentary view in partial section of the measuring device shown in FIG. 1.

In FIG. 1, reference numeral 1 denotes a column on which a spindle head 2 is mounted for vertically upward and downward movement (Y direction as seen in FIG. 2) along the column. A measuring device 3 is mounted on the spindle head 2 for movement together with the latter and the spindle head also supports a main spindle 4 therein. The spindle head 2 further supports a tool changing device 15 which is adapted to replace a particular tool now supported in the main spindle 4 with a different tool. Reference numeral 5 denotes a machine bed on which a saddle 6 is mounted for movement in the longitudinal axis of the bed 5 (X direction as seen in FIG. 8) and a table 7 is mounted on the saddle 6 for movement in a plane parallel to the axis of the main spindle 4 (Z direction as seen in FIG. 2). The table 7 in turn supports a turntable 8 thereon for rotational movement with respect to the table 7 and the turntable is adapted to fixedly supports thereon a workpiece W (not shown in FIG. 1) which is to be fastened on the turntable by any suitable conventional fastening means. A control device 9 for controlling the operation of the measuring device 3 is adapted to give a signal to the measuring device 3 to drive the latter for measuring operation. The result obtained by the operation of the measuring device 3 is converted into a digital compensating value by control device 9 and the compensating value is transmitted to a numerical control device 10 to operate the latter for compensating operation.

The numeral control device 10 is adapted to automatically determine a particular relative position of the main spindle 4 and measuring device 3 with respect to the workpiece W held in position on the turntable 8 in accordance with a predetermined program and give numerical signals for controlling various steps in a particular boring operation to be carried on the workpiece such as processing, measuring and compensating steps.

Reference numeral 11 denotes an auxiliary control device in which an oil pressure motor, an oil tank, a solenoid valve, a lubricating system and the like (not shown) are housed.

FIG. 2 shows the details of the measuring device 3 which was briefly described hereinabove and the measuring device comprises a feed until 301 and a measuring head assembly 303 to be fed by the feed unit. As mentioned above, since the measuring device is fixedly mounted on the spindle head 2 for movement together with the spindle head, the relative position of the measuring device 3 to the main spindle 4 in the X - Y plane is at all times maintained constant.

A measuring device saddle 302 is slidably supported by the feed unit 301 for slidable movement along the feed unit in the arrow Z direction between the operative or measuring position and the inoperative or waiting position. A measuring head assembly 303 is hung on a support frame 304 by means of a balance arm 101, a balance weight 102 and a leaf spring 103. The measuring head assembly 303 is further connected to the saddle 302 by means of a pair of spaced parallel springs 104 as shown in FIG. 2 so that transferences in X and Y direction of the measuring head can be prevented and the measuring head assembly can be prevented from being subjected to any excessive measuring pressure which is to be applied thereto by measuring elements of which description will be made hereinafter. A servo motor 305 is mounted on the measuring head assembly 303 and the rotational movement of the servo motor is transmitted to a threaded rod 308 through a gear train 306 and 307. The threaded rod 308 is engaged by a movable engaging piece 309 which is also provided at one or the inner end with threads and adapted to displace along the rod 308 as the rod rotates. The engaging piece 309 forms one measuring element of a pair of measuring elements the other of which will be described hereinbelow. Another measuring element 310 which forms the other element of the pair of measuring elements is provided in opposite and parallel to the engaging piece 309 and supported in the measuring head assembly 303 by means of a cross-shaped leaf spring for pivotal movement without rattling. The above-mentioned pair of measuring elements 309 and 310 are controlled by the servo motor 305 and by measuring the distance between the measuring elements the diameter of a bore processed in the workpiece during a trial boring operation can be determined. Reference numeral 311 denotes a fine displacement instrument which is engagement with the measuring element 310 and gives a zero position indication when the measuring element 310 has displaced by a predetermined pivotal angle.

In the illustrated embodiment, although one of the measuring elements or the measuring element 310 is shown as being fixedly secured to the measuring head assembly 303 by a cross-shaped leaf spring, according to the present invention it is also contemplated that the threaded rod 308 is provided at the opposite ends with left-hand and right-hand threads, respectively and both the engaging piece 309 and measuring element 310 engage the threaded rod for movement in the opposite directions to each other along the rod.

Figure 3:
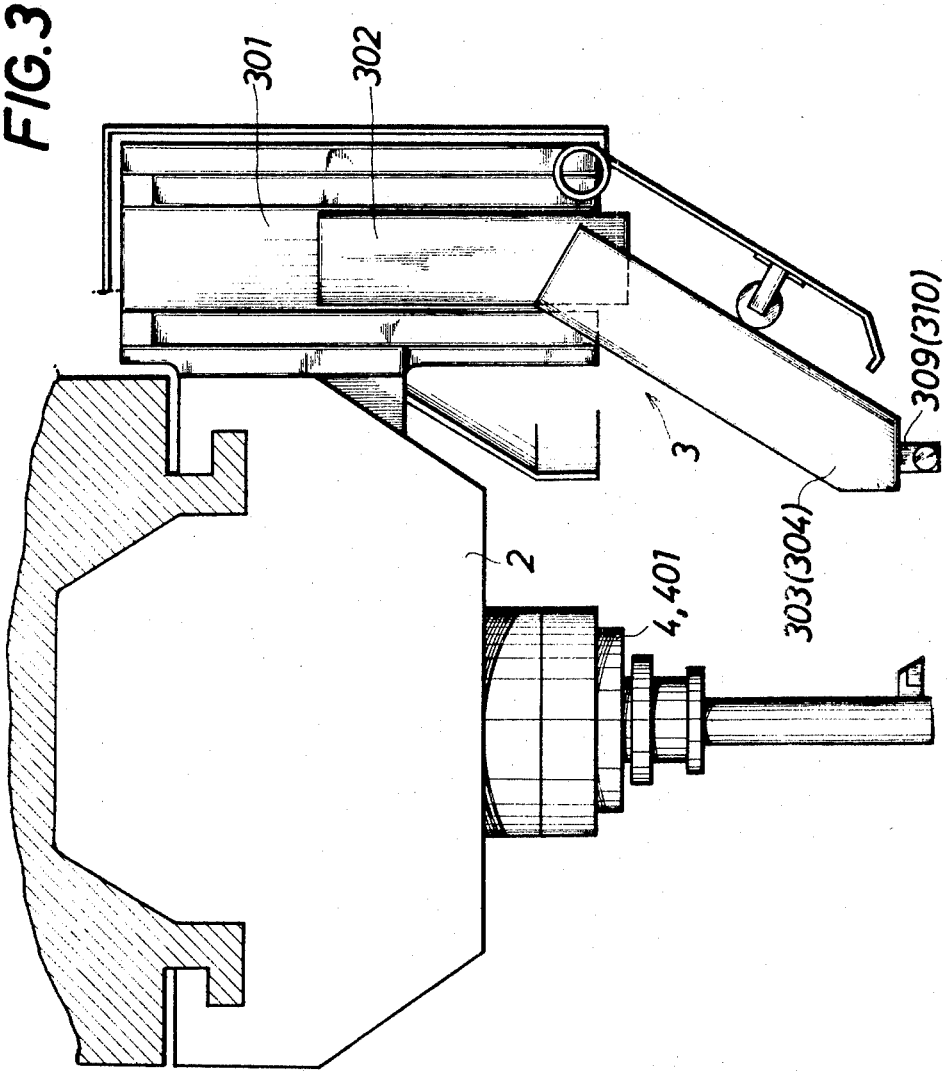
FIG. 3 is a further enlarged fragmentary plan view showing said measuring device in its operative or measuring position.
Figure 4:
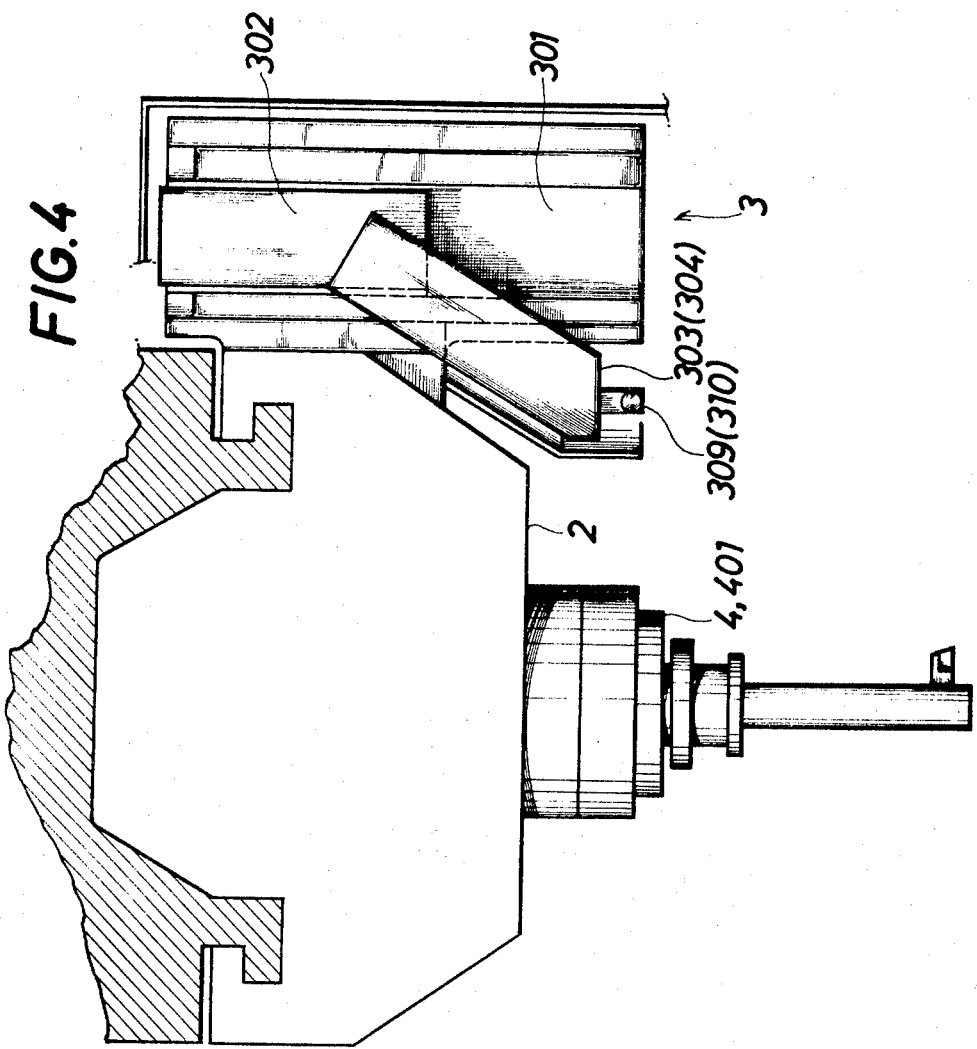
FIG. 4 is similar to FIG. 3, but shows said measuring device in its inoperative or retracted position.

When the diameter of the bore processed in the workpiece W is to be measured, the measuring device 3 with the above construction is fed or advanced to the position as shown in FIG. 3 and during the machine tool in which the measuring device 3 is incorporated is performing a trial boring operation on a workpiece W, the measuring device is retracted to the position as shown in FIG. 4 and held in this position so that the device will not interfere with the processing or boring operation.

According to the present invention, there is further provided an adjusting device which is adapted to finely adjust the position of the edge point of a single point cutting tool being employed in accordance with any detected or measured difference between the diameter of the bore processed in the trial boring operation and that of a desired or complete bore to be obtained in the finish operation as determined by a predetermined numerical control program. The adjusting device will be described referring to FIGS. 5, 6 and 7 of the accompanying drawings.

In FIG. 5, the main spindle 4 is shown as having a cutting tool 111 with a tapered shank supported at the outer end and being received in the eccentric opening of main spindle sleeve 401. The axis of rotation S of the main spindle sleeve 401 is deviated from the center 0 of the eccentric opening by the amount as shown with in FIG. 5. The main spindle sleeve 401 is positively journalled in spaced bearings 112, 113 and 114 which are in turn supported in the headstock 2 in the conventional manner. The other or inner end of the main spindle 4 is provided on the outer periphery with spline grooves and the projections defined by the spline grooves are received in the mating spline grooves provided in the inner periphery of an Oldhams coupling element 402. A stub shaft 421 is fixedly secured the rear or inner end of the headstock 2 of the main spindle assembly in concentric relationship to the main spindle 4. The stub shaft 421 supports a gear 403 thereon by means of bearings 415 and one end of the gear 403 is also formed in the shape of an Oldhams coupling which cooperates with the above-mentioned Oldhams coupling 402 and an intermediate element 404 disposed between the two couplings to form a universal joint. A drive gear 420 is in engagement with the gear 403 and fixedly supported on a shaft 425 which is in turn journalled in the frame of the spindle head 2 by means of bearings. The drive gear 420 is in engagement with a conventional main spindle drive gear train (not shown) to be driven by the latter and when the drive gear 420 is driven or rotated by the main spindle drive gear train, the rotational movement of the drive gear is transmitted through the engaging gear 403 to the main spindle 4 and accordingly, to the main spindle sleeve 401 which is fixedly secured to the main spindle 4 for rotation therewith. A spindle 406 is journalled in the frame of the spindle head 2 by means of bearings and has at one end a gear 405 which engages the gear 403 whereas the threaded other end of the spindle 406 is engaged by a bevel gear which forms a differential gearing together with two opposite bevel gears 408 which engage the gear 407 on the opposite sides of the latter and a bevel gear 409 which is identical with and opposite to the bevel gear 407 and engages the gears 408. The housing 414 of the differential gearing has the outer periphery formed at one end with a gear which engages a drive gear 422 fixedly mounted on the main spindle sleeve 401 at an intermediate point between the opposite ends thereof. The housing 414 of the differential gearing is rotatably mounted on the spindle 406 by means of bearings 416. The bevel gear 409 is integral to a worm gear 411 which is mounted on a spindle 424 which is in turn journalled in the spindle head 2 by means of bearings. A worm 412 is connected to the servo motor 12 (not shown in FIG. 5) and when driven by the servo motor, the worm imparts a rotational movement which is numerical-controlled (change in the eccentricity of the main spindle with respect to the sleeve for adjusting the cutting-in depth of the edge of the cutting tool into the workpiece) to the worm gear 411.

With the above construction of the adjusting device, on the assumption that the drive gear 420 is rotated in the clockwise direction as seen from the arrow direction (FIG. 5) by the drive means (not shown), for example, the gear 403 in engagement with the drive gear 420 is rotated in the opposite or counter-clock direction as seen from the arrow direction and the rotation of the gear 403 in the above direction rotates the coupling element 402 through the intermediate element 404 which in turn rotates the main spindle 4 through the coupling element 402 mounted on the main spindle. And since the gear 403 is in engagement with the drive gear 405 of the differential gearing, the rotation of the gear 403 in the counterclock direction as referred to above also rotates the drive gear 405 in the clockwise direction and accordingly, rotates the drive spindle 406 on which the drive shaft 405 is fixedly mounted in the clockwise direction.

As mentioned above, the drive shaft 406 is engaged by the bevel gear 407 and the bevel gear cooperates with the bevel gears 408 in engagement therewith and a cross shaft 423 which extends through the bevel gears 408 and secured at the opposite ends to the opposite walls of the housing 414 to form the differential gearing. The bevel gears 408 which engage the bevel gear 407 are rotatably mounted by means of bearings on the cross shaft 423 which is in turn supported in the housing 414 of the differential gearing and the bevel gear 409 which engages the bevel gears 408 is integrate to the worm gear 411. Since the worm gear 411 is in engagement with the worm 412, the worm gear 411 remains stationary in self-clocking unless rotational movement is transmitted thereto from the servo motor 12.

With the worm gear 411 remaining stationary in self-locking, when the drive spindle 406 is rotated in the clockwise direction, the housing 414 rotates in the same direction as the drive spindle 406 at the rate of one-half of that at which the drive spindle 406 rotates in accordance with the principle of the differential gearing and the gear 422 on the main spindle sleeve 401, which is in engagement with the gear mounted on the outer periphery of the housing 414, is rotated in the counter-clock or the same direction as the main spindle 4. When the number of gear tooth ratio among the gears 403, 405, 414 and 422 is assumed as follows:

$$\frac{\text{number of teeth of gear 403} \times \text{number of teeth of gear 414}}{\text{number of teeth of gear 405} \times \text{number of teeth of gear 422}} = 2$$

then, the main spindle 4 and main spindle sleeve 401 rotate in the same direction at the same rate as if they were a single unit. Suppose that the positional relationship among the tool 111 supported by the main spindle 4, the axis O of the main spindle and the axis S of the main spindle sleeve 401 is as shown in FIG. 6, in such a case, since the main spindle 4 and main spindle sleeve 401 rotates about the axis S, the radius of gyration of the edge point P of the tool 111 will be $\overline{OS} + \overline{OP}$ or the amount of eccentricity will be $\epsilon + \overline{OP}$. Description will be made on the manner by which the radius of gyration of the edge point P of the tool 111 is adjusted. When the servo motor 12 connected to the worm 412 is energized by the convention means, the worm is rotated by the motor and the rotation of the worm in turn rotates the worm gear 411 and accordingly, rotates the bevel gear 409 which is in engagement with the worm gear. The rotational movement of the worm gear rotates the housing 414 and accordingly, the main spindle sleeve 401 in accordance with the principle of the differential gearing. In this way, the positional relationship between the axis O of the main spindle 4 and the axis S of the main spindle sleeve 401 will be varied to the edge point P. Thus, after the main spindle sleeve has rotated 180° from the position of FIG. 6, the sleeve will occupy the position of FIG. 7 in which the radius of gyration of the point P of the tool 111 is $\overline{OP} - \overline{OS}$ or $\overline{OP} - \epsilon$ and the adjusting amount of the edge point P becomes 2 $\epsilon$ whereby the adjusting amount two times as great as the amount of eccentricity of the main spindle with respect to the sleeve can be obtained. If the amount of eccentricity and the reduction ratio of the worm 412 to the worm gear 411 are present at suitable values, respectively, when the servo motor 12 is rotated in response to a numerical control signal to adjust the edge point P, a desired or predetermined bore diameter can be obtained.

FIG. 8 is a view which explains the operation of the overall machine tool in which the bore diameter measuring and cutter edge adjusting apparatus of the invention is incorporated. In operation, the workpiece W is fixedly held in position on the turntable 8 and then X axis servo motor 801 is energized to drive a threaded rod 811 for moving the turntable 8 towards the X axis direction through suitable gears and Y axis servo motor 802 is energized to drive another threaded rod 812 for moving the spindle head 2 towards the Y axis direction through suitable gears whereby a numerical controlled positioning operation for determining a relative position between the workpiece W and the main spindle. Z axis servo motor 803 is energized to drive a third threaded rod 813 which in turn feeds the table 7 to a desired cutting operation position in the Z direction (FIG. 2). Description will be made of an operation for processing a bore in the workpiece W on the turntable 8. A single point cutting tool is mounted in the main spindle manually or through the automatic tool exchanging device 15.

Thereafter, prior to the boring operation, the driving sequence of the X 801, Y 802 and Z 803 axis servo motors, the measuring servo motor 305 and the motor for adjusting the radius of gyration of the tool edge point is programmed in a magnetic drum, a magnetic tape or the like and the numerical control device 10 is prepared for giving a signal in accordance with the program memorized in the magnetic drum, a magnetic tape or the like. Then, the X and Y axis are positioned in accordance with the signal from the numerical control device so that the center line of a bore to be processed in the workpiece W will be coincide with the center line of the tool 111.

While the tool 111, the radius of gyration of the edge point of which has been set so that a bore having a diameter slightly smaller than that of a desired or complete bore can be obtained, is rotating together with the rotating main spindle 4 for a particular trial boring operation, the table 7 is driven in the Z direction to feed the workpiece W towards the tool 111 whereby the machine tool is ready for a trial boring operation.

The cutting length of the bore in Z direction may be a length just sufficient for measuring and the cutting length is usually on the order of 3 mm. After the completion of the trial boring, the processed workpiece is positioned in a measuring position. The positioning of the workpiece W is so carried out that the line passing through the measuring points of the pair of measuring elements 309 and 310 is coordinated with the center of the trially processed bore and the stationary measuring element 310 will not contact any point on the inner periphery of the bore being measured. After the workpiece W has been positioned in the measuring position in the manner mentioned above, the measuring head assembly 303 is fed or advanced by the feed unit 301 until the pair of measuring elements 309 and 310 are positioned within the bore. Thereafter, the numerical control device 10 drives the servo motor 305 in accordance with the programmed signal to move the movable measuring element relative to the stationary measuring element until a predeterminate precise measuring position with respect to the bore to be measured. The distance between the two measuring elements 309 and 310 in such a precise measuring position is so predetermined that when the movable measuring element 309 has pivoted by a predetermined pivotal angle the fine displacement instrument 311 contacts the element 309 to give the zero indication. Therefore, before the movable measuring element 309 reaches the predetermined position, the measuring head assembly 303 is displaced in contact the element 309 with the inner periphery of the bore at a upper point by lowering the measuring head assembly 303 supported on the parallel leaf springs 104 in parallel with Y axis, and the element 309 reaches the predetermined position of measuring head assembly 303, at the same time the other measuring element 310 which is supported on the cross shaped leaf spring pivots in contact with the inner periphery of bore at a lower point depending upon the diameter of the bore.

With the above construction and arrangement of the measuring elements, since the bore processed in the workpiece during the trial boring operation usually has a diameter smaller than that of a desired or complete bore as mentioned above, the displacement amount of the movable measuring element 309 is not equal to the predetermined amount of pivoted angle and accordingly, the displacement reading of the fine displacement instrument 311 deviates from the zero indication position. The deviation measured by the instrument 311 is converted into a voltage representing the deviation by a differential transformer or the like (not shown) incorporated in the instrument 311 and the voltage is transmitted to the control means 9 of the measuring device 3. This control means 9 includes an analog digital converter, a measuring result register, a measuring result indication tube and the like (all of which are not shown) therein. The voltage is converted into a digital amount and a value representing the digital amount is memorized in the measuring result register and at the same time, the measuring result indication tube gives an indication showing the measuring result. The thus memorized measuring result can be read out in accordance with call signals memorized in a tape.

After the measuring operation, the measuring head assembly 303 is returned to the initial position, the workpiece W is positioned in a precise boring position and the numerical control device 10 reads out the measuring results from the control device 9 and gives a signal to the motor 12 for the bore diameter adjusting device to adjust the position of the edge point of the tool 111 by moving the edge of the tool in the radial direction of the tool rotation so that a precise or predetermined bore diameter can be obtained.

Thereafter, the proper or finish boring operation is carried out in accordance with the program. It will be, of course, optional whether an additional measuring operation is conducted or not after the proper boring operation.

When the diameter of the bore processed in the trial boring excessibly deviates from the predetermined bore diameter due to excessive wear and/or breakage of the tool edge, error in the program and/or the like, the pointer of the fine displacement instrument 311 wanders over a wide range and therefore, a high voltage appears in the fine displacement instrument and more particularly, differential transformer. Thus, according to the present invention, it is so designed that when a high voltage in excess of a predetermined value appears in the fine displacement instrument, the control device gives a program termination signal and a scale-over indication.

As clear from the foregoing, as compared with the comparable conventional bore diameter measuring apparatus for numerical controlled machines which employs control shafts for positioning a workpiece and the accuracy of the control shafts are insufficient to attain the tolerance limits specified by the Japanese Industrial Standard, for example, such as 0.011 mm and 0.016 mm for Gauge 5 and Gauge 6 bores, respectively, having diameters ranging from 30 – 50 mm, according to the present invention, the numerical control apparatus employs the measuring shaft having a far higher accuracy than that of the control shafts of the conventional positioning apparatus and thus, the apparatus of the invention can measure even only a slight deviation in bore diameter with high precision. Furthermore, the bore diameter measuring operation can be performed in a single step by the use of the pair of measuring elements and error in measuring can be minimized. And since the measuring operation can be performed while the main shaft holds therein the same tool which was employed in the trial boring, there will be no error in measuring which may otherwise occur at the time of the installation in or doffing off of the tool as seen in the conventional comparable apparatus thereby to ensure a high pre-boring operation. Finally, if the so-called "scale over" occurs due to excessive wear on and/or breakage of the tool edge, ill-scheduled program and/or the like, the apparatus of the invention can automatically terminate the program and give an indication showing the scale-over to the operator.

In the foregoing, the invention has been described with reference to a specific illustrative embodiment. It will be evident, however, that variations and modifications, as well as the substitution of equivalent parts or elements for those shown herein for illustration, may be made without departing from the broader scope and spirit of the invention as set forth in the appended claims. The specification and drawings are accordingly to be regarded in an illustrative rather than in a restrictive sense.

What is claimed is:

1. A numerical controlled boring machine having a numerical control device and a control device for controlling the processing of a workpiece, comprising; an automatic bore diameter measuring and compensating apparatus which comprises a spindle head having a main spindle for rotation therewith, said main spindle being adapted to support a single cutting tool; a compensating device for adjusting the radius of gyration of an edge point of said cutting tool; and a measuring device including, a bore diameter measuring element, adapted to be displaced along a bore diameter, for measuring in response to a signal from said control device, and a control shaft provided independently of positioning control shafts and including; a measuring result register whereby the measuring result of said measuring device are given to said compensating device so as to compensate for any difference between the diameter of a bore processed during a trial boring operation and a desired diameter for a complete bore to be processed in a finish boring operation, in which said apparatus further includes: a main spindle sleeve having an axial eccentric opening for receiving said main spindle on which a single cutting tool is adapted to mounted, a differential gear mechanism and rotary coupling means for connecting said main spindle sleeve and main spindle for usual rotating in cutting operation while maintaining the two members in an angular phase difference and a servo motor adapted to impart a numerical control rotational movement to said necessary angular phase difference.

2. An automatic bore diameter measuring and compensating apparatus as set forth in claim 1, in which feed means are provided on said spindle head parallel to the axis of said main spindle for moving said measuring device along said feed means between its measuring position, and retracted position whereby the relative position between the axis of rotation of said main shaft and the position of the measuring device is always maintained constant.

3. An automatic bore diameter measuring and compensating apparatus as set forth in claim 2 in which said apparatus comprises: a measuring head assembly which is provided with a pair of measuring elements, said servo motor, and a fine displacement instrument, said measuring elements being adapted to be in contact with the inner periphery of said bore processed during said trial boring operation to measure and determine the difference between the diameter of said bore and the desired diameter of a complete bore to be processed, said servo motor being arranged to be driven in accordance with a programmed signal to move said measuring elements until said elements come to have a predetermined space therebetween which is equal to the desired diameter of said complete bore, and said fine displacement instrument serving to determine said difference and thereby convert said difference into a voltage to be transmitted to the control means of said control device.

* * * * *